United States Patent
Bank et al.

(10) Patent No.: US 9,367,542 B2
(45) Date of Patent: Jun. 14, 2016

(54) FACILITATING ACCESS TO RESOURCE(S) IDENFITIED BY REFERENCE(S) INCLUDED IN ELECTRONIC COMMUNICATIONS

(71) Applicant: International Business Machines Corporation, Armonk, NY (US)

(72) Inventors: Judith H. Bank, Morrisville, NC (US); Liam Harpur, Skerries (IE); Ruthie D. Lyle, Durham, NC (US); Patrick J. O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 13/738,310

(22) Filed: Jan. 10, 2013

(65) Prior Publication Data

US 2014/0195680 A1   Jul. 10, 2014

(51) Int. Cl.
*G06F 15/173* (2006.01)
*G06F 17/30* (2006.01)
*H04L 12/58* (2006.01)
*H04L 29/06* (2006.01)
*G06F 21/60* (2013.01)

(52) U.S. Cl.
CPC .............. *G06F 17/30* (2013.01); *G06F 21/604* (2013.01); *H04L 51/00* (2013.01); *H04L 51/04* (2013.01); *H04L 51/32* (2013.01); *H04L 63/102* (2013.01)

(58) Field of Classification Search
CPC ....... G06F 21/604; G06F 17/30; H04L 51/00; H04L 63/102
USPC .................................................. 709/223, 225
See application file for complete search history.

(56) References Cited

U.S. PATENT DOCUMENTS

| | | | |
|---|---|---|---|
| 7,373,347 B2 | 5/2008 | Takahashi et al. | |
| 8,073,855 B2 | 12/2011 | Nagoya | |
| 8,589,502 B2 * | 11/2013 | O'Sullivan | G06F 21/6209 709/206 |
| 8,793,503 B2 * | 7/2014 | Simske | H04L 9/3247 713/166 |
| 8,909,708 B2 * | 12/2014 | Hansson | G06F 17/30887 709/204 |
| 2002/0162027 A1 * | 10/2002 | Itwaru | G06Q 20/02 726/15 |
| 2003/0046586 A1 * | 3/2003 | Bheemarasetti | H04L 63/0272 726/15 |

(Continued)

OTHER PUBLICATIONS

Rosenberg et al., "A Framework for Consent-Based Communications in the Session Initiation Protocol (SIP) (RFC5360)," IP.com Prior Art Database Technical Disclosure No. IPCOM000176014D, Oct. 1, 2008, 33 pages.

(Continued)

*Primary Examiner* — Mohamed Wasel
(74) *Attorney, Agent, or Firm* — Yee & Associates, P.C.; David Woycechowsky

(57) ABSTRACT

A technique for using a reference to identify permissions required to access a resource. One or more processors detect a reference in an electronic communication. The reference points to a resource stored in storage of a data processing system. The one or more processors identify a set of permissions required to access the resource pointed to by the reference in the electronic communication. The one or more processors then perform a set of access-oriented actions associated with the set of permissions.

20 Claims, 7 Drawing Sheets

(56) References Cited

U.S. PATENT DOCUMENTS

| | | | |
|---|---|---|---|
| 2003/0101199 A1* | 5/2003 | Briggi | G06F 17/30011 |
| 2007/0220145 A1* | 9/2007 | Kozakura | G06F 17/30887 |
| | | | 709/225 |
| 2007/0233685 A1 | 10/2007 | Burns et al. | |
| 2009/0132509 A1* | 5/2009 | Nagoya | H04L 63/145 |
| 2009/0328156 A1 | 12/2009 | Malaviarachchi et al. | |
| 2011/0099380 A1* | 4/2011 | Vandewater | H04L 63/102 |
| | | | 713/176 |
| 2011/0209196 A1* | 8/2011 | Kennedy | G06F 21/55 |
| | | | 726/1 |

OTHER PUBLICATIONS

Zeilenga, "Named Subordinate References in Lightweight Directory Access Protocol (LDAP) Directories (RFC3296)," IP.com Prior Art Database Technical Disclosure No. IPCOM000009216D, Jul. 1, 2002, 16 pages.

"Search results, filter by access rights," stackoverflow.com, StackExchange, Jun. 2011, 2 pages, accessed Dec. 14, 2012, http://stackoverflow.com/questions/6257080/search-results-filter-by-access-rights.

* cited by examiner

FACILITATING ACCESS TO RESOURCE(S) IDENFITIED BY REFERENCE(S) INCLUDED IN ELECTRONIC COMMUNICATIONS

BACKGROUND

1. Field

The disclosure relates generally to data processing systems and, in particular, to managing electronic communications. Still more particularly, the present disclosure relates to a method, apparatus, and computer program for performing actions to facilitate access to a resource pointed to by a reference in an electronic communication.

2. Description of the Related Art

Users communicate with each other through electronic communications. These communications may be postings over a social network, instant messages, email, and many other forms of electronic communication. These communications sometimes include references. A reference is a pointer to a resource. For example, a reference in an electronic communication may be a universal resource locator (URL). The reference may be a link to resources, such as another electronic communication, a document outside of the electronic communication, a document attached to the electronic communication, streaming media, and other types of data.

Users accessing electronic communications will often times wish to access a resource pointed to by a reference in the communication. However, a user who has access to the communication may not have access to the resource pointed to by the reference in the communication. For example, a user may receive an email with a reference for a document stored in a secure repository. In this example, the user may select the reference in the email and then subsequently receive an error message stating that the user does not have permission to access the reference.

Additionally, users of search engines oftentimes receive invalid search results, insufficient search results, or both receive invalid search results and insufficient search results. For example, a user may make a search request to a corporate search engine. In this example, the search engine may return a list of results, some of which the user does not have access to. Further in this example, the search engine may filter out some of the results of the search because the user does not have access.

Therefore, it would be desirable to have a method, apparatus, and computer program product that takes into account at least some of the issues discussed above.

SUMMARY

In one illustrative embodiment, a method, apparatus, and computer program product for managing electronic communications is disclosed. An apparatus detects a reference in an electronic communication, wherein the reference is pointing to a resource stored in storage of a data processing system. The apparatus identifies a set of permissions required to access the resource pointed to by the reference in the electronic communication. The apparatus then performs a set of access-oriented actions associated with the set of permissions.

DETAILED DESCRIPTION

Figure 1:
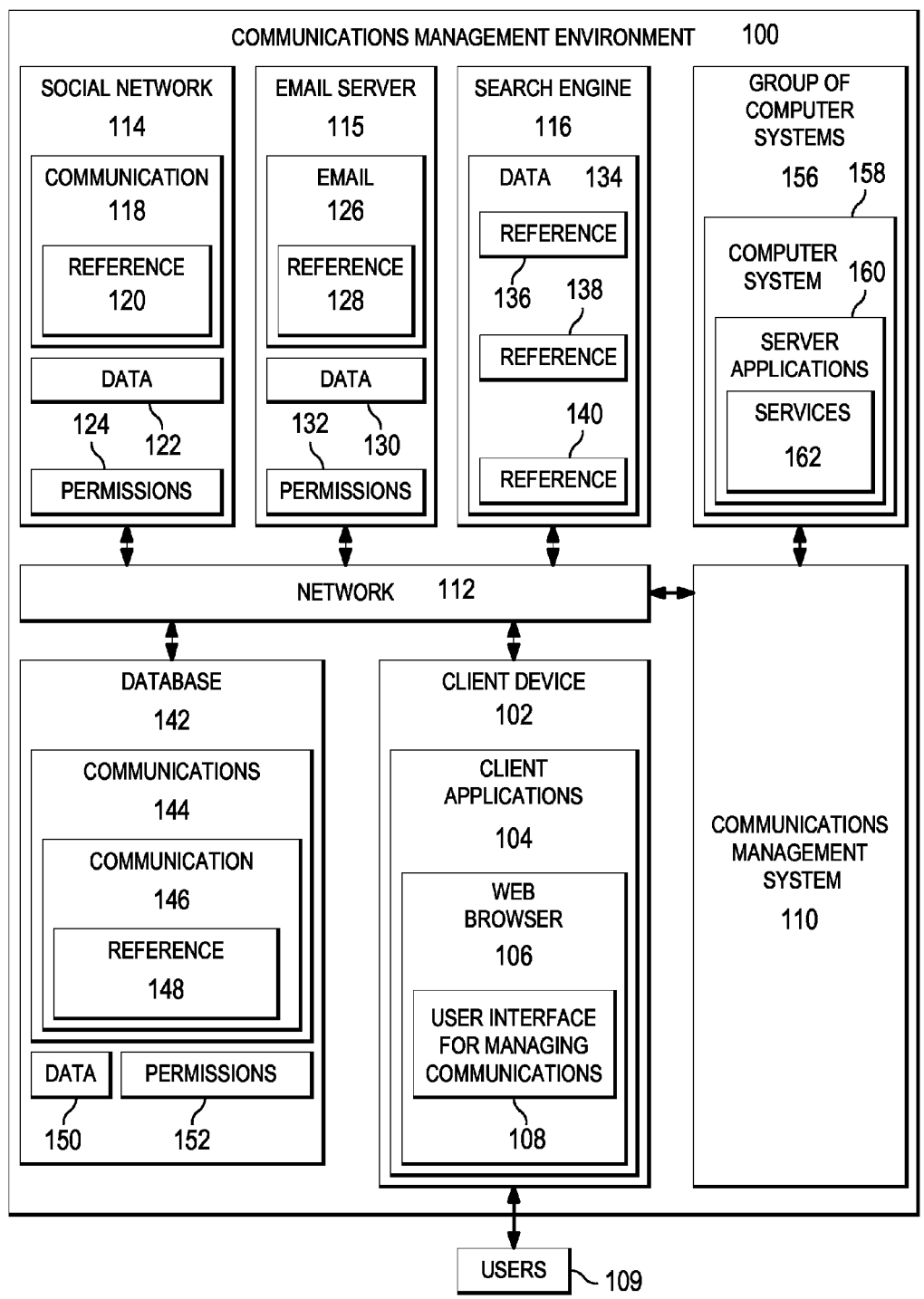
FIG. 1 is an illustration of a communications management environment for managing access to resources pointed to by references in electronic communications in accordance with an illustrative embodiment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including, but not limited to, wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may be run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The illustrative embodiments recognize and take into account that existing web servers are available for use by users of web sites. These web servers communicate with web browsers by generating web pages and sending the web pages to a web browser. The generated web pages are typically displayed on a display screen by a web browser running on a computing device. For example, a server of a search engine web site may generate a web page comprising search results responsive to receiving a search request from a user. In this example, the user that made the search request may use the computing device to select a reference in the search results generated by the search engine. As another example, an email server may be used by users to exchange emails with other users. In this example, an email sent by a user may contain a reference, such as a universal resource locator to a document stored in a secure repository.

As used herein, the term "reference" means a pointer to a resource. The resource pointed to by the reference may be an electronic communication, a document, streaming data, and any other suitable type of resource. In these illustrative examples, a reference may be in the form of universal resource locator (URL) and any other suitable type of reference for identifying a resource. As also used herein, the term "computing device" means a hardware device with a processor unit and a capability to display information on a display device and may also include the capability to emit audio on a speaker. For example, the computing device may be a computer, a television with a processor unit, a smart phone, and any other suitable device.

The illustrative embodiments also recognize and take into account that existing web servers are available for sharing electronic communications between members of social networking web sites. For example, a server of a social networking web site may generate a web page comprising data that has been posted or reposted by a member of the social network. In this example, the data posted or reposted by the member of the social network may include a reference, such as a reference to another post by another member in the social network. The illustrative embodiments further recognize and take into account, that a set of users of an electronic communication may have access to a resource pointed to by a reference in the communication and another set of users of the communication may not have access to the resource pointed to by the reference in the communication.

As used herein, the term "electronic communications" comprise data that is shared between a first set of users and a second set of users. A "set," as used herein with reference to items, means one or more items. For example, "set of users" is one or more users. As also used herein, a user or users may comprise an individual such as a customer, an employee of corporation, a member of a social network, a legal representative, and other suitable types of individuals that send and receive electronic communications. The electronic communications may be sent by one set of users and received by another set of users. The electronic communications may also be posted or reposted by a set of users for access by another set of users. A set of users may include a set of individual users, members of an organization, employees of a corporation, members a social network, and members of other suitable types of groups. In these illustrative examples, the term "communications" means "electronic communications" and the term "communication" means "electronic communication."

Having "access to a resource pointed to by a reference," as used herein means a user has permission to access the resource referred to by the reference. For example, a user may have permission to access an electronic communication that includes a reference pointing to a resource. Further in this example, the user may select the reference in the communication. The selection of the reference in the communication may generate an error due to the user not having permission to access the resource pointed to by the reference. For example, the user may not have access to the resource because the user does not have permission to retrieve a resource referred to by the reference.

Thus, the different illustrative embodiments provide a method, apparatus, and computer program product to manage electronic communications. For example, the different illustrative embodiments may use a process in a communications management system for managing access to resources pointed to by references detected in electronic communications. For example, a communications management system may detect a reference in an electronic communication, wherein the reference points to a resource stored in storage of a data processing system. The communications management system may identify a set of permissions required to access the resource pointed to by the reference in the communication. The communications management system may then perform a set of access-oriented actions associated with the set of permissions.

With reference now to the figures and, in particular, with reference to FIG. 1, an illustration of a communications management environment for managing access to resources pointed to by references in electronic communications is depicted in accordance with an illustrative embodiment. In this illustrative example, communications management environment 100 is depicted in block diagram form.

Client applications 104 run on client device 102 within communications management environment 100. Client applications 104 may take various forms. For example, client applications 104 may include web browser 106. Client applications 104 also may include in addition to or in place of web browser 106 at least one of a communications management application, a database application, a smart-phone application, an audio based web browser, and other suitable types of applications. In these illustrative examples, the web browser may display information on a display screen and may also present information to by using a speaker to emit audio.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

As depicted, client applications 104, such as web browser 106 present user interface for managing communications 108 to users 109 of client device 102. In these illustrative examples, user interface for managing communications 108 may be displayed in web browser 106 in a process for managing access to resources pointed to by references in communications management system 110. As depicted, client applications 104 in client device 102 may communicate with communications management system 110 over network 112. As also depicted, communications management system 110 and client applications 104 in client device 102 may communicate with social network 114 email server 115, and search engine 116 over network 112.

In these illustrative examples, social network 114 is a web server for electronic communications, such as communication 118. As depicted communication 118 comprises reference 120. In these illustrative examples, reference 120 is a pointer to a resource. For example, reference 120 may be a link pointing to a portion of data 122. As another example, reference 120 may comprise a link that points to a portion of communication 118. Reference 120 may also point to a resource outside of social network 114. As depicted, data 122 comprises resources that are referred to by references in electronic communications, such as by reference 120. As also depicted, permissions 124 in social network 114 comprise a set of access permissions for users 109. For example, permissions 124 may comprise a set of access permissions for users 109 to access reference 120.

For example, social network 114 may provide services to search for and browse electronic communications, such as communication 118 posted or reposted by a member of social network 114. In this example, the member of social network 114 may have previously selected reference 120 when posting or reposting communication 118. Further in this example, access to a resource pointed to by reference 120 may require a set of permissions. For example, responsive to a user attempting to access a resource pointed to by reference 120, social network 114 may check if the user has a set of access permissions in permissions 124 that correspond to the set of permissions required to access the resource pointed to by reference 120.

In these illustrative examples, email server 115 is used to send and receive email, such as email 126. As depicted email 126 comprises reference 128. In these illustrative examples, reference 128 is a pointer to a resource. For example, reference 128 may be a link pointing to a portion of data 130. As another example, reference 128 may comprise a link that points to a portion of email 126. Reference 128 may also point to a resource outside of email server 115. As depicted, data 130 comprises resources that are referred to by references in electronic communications, such as by reference 128. As also depicted, permissions 132 in email server 115 comprise a set of access permissions for users 109. For example, permissions 132 may comprise a set of access permissions for users 109 to access a resource pointed to by reference 128.

For example, email server 115 may provide services to send and receive electronic communications, such as email 126 sent or received by an email account owner of email server 115. In this example, the email account owner of email server 115 may have previously selected reference 128 when sending email 126. Further in this example, access to the resource pointed to by reference 128 may require a set of permissions. For example, responsive to a user attempting to access the resource pointed to by reference 128, email server 115 may check if the user has a set of access permissions in permissions 132 that correspond to the set of permissions required to access the resource pointed to by reference 128.

In these illustrative examples, search engine 116 is used to search data 134. For example, a user may use web browser 106 to send a search query to search engine 116. In this example, client device 102 presents search results generated by search engine 116 responsive to receiving the search results from search engine 116. In these illustrative examples, the search results generated by search engine 116 may include one or more portions of data 134 according to the search query. For example, search results may include a set of references such as reference 136, reference 138, and reference 140. In these illustrative examples, the set of references may be for portions of data 134 in search engine 116 and may also be for resources outside of search engine 116. For example, search engine 116 may provide services to identify a set of references in electronic communications such as reference 120 in communication 118, reference 128 in email 126, and reference 148 in communication 146 in communications 144 in database 142. As another example search engine 116 may provide web crawler services that identify a set of references in data 134 to portions of data 122, data 130, and data 150 in database 142. In these illustrative examples, search results generated by search engine 116 may include a set of references pointing to resources that require a set of permissions. For example, responsive to a user selecting to access a portion of data 150 pointed to by reference 136, data base 142 may check if the user has a set of access permissions in permissions 152 that correspond to the set of permissions required to access portion of data 150 pointed to by reference 136. In these illustrative examples, database 142 may be a repository for electronic communications and data for servers, such as social network 114 and email server 115. Database 142 may also be an enterprise database, a government database and any other suitable type of repository for storing communications 144, data 150, and permission 152.

In these illustrative examples, computer system 158 within group of computer systems 156 is one or more computers. Also, as used herein, "group of" when used with reference to items means one or more items. For example, group of computer systems 156 is one or more computer systems. When computer system 158 is more than one computer, the computer system may take the form of a computer cluster, group of computer systems 156, or other configurations of computer systems configured to run server applications 160.

Communications management system 110 uses sever applications 160 located on computer system 158 in group of computer systems 156. A computer system is one or more computers in these illustrative examples. Server applications 160 may be any applications configured to process electronic communications to provide services 162. Server applications 160 may be, for example, at least one of a database server, a file transfer protocol (FTP) server, a web server, a mail server, a search engine web crawler, and other suitable types of applications. Services 162 may include, for example, at least one of retrieving a file, retrieving a webpage, retrieving information, writing information, downloading a program, and other suitable types of access.

Communications management system 110 may be implemented using hardware, software, or a combination of the two. In these illustrative examples, communications management system 110 is configured to manage electronic communications using group of computer systems 156. Electronic communications sent by client applications 104 in client devices such as client device 102 are processed by communications management system 110. In these illustrative examples, communications management system 110 is configured to use services 162 of server applications 160. For example, communications management system 110 may use a service in services 162 to search through electronic communications to detect a reference in an electronic communication that requires a set of permissions for access. In these illustrative examples, communications management system 110 may be implemented as an agent in one or more of client device 102, social network 114, email server 115, search engine 116, and database 142. For example, communications management system 110 may process electronic communications sent from users 109 and communications received by users 109. In these illustrative examples, communications management system 110 may also be implemented as a proxy between client device 102, social network 114, email server 115, search engine 116, and database 142. For example, communications management system 110 may process electronic communications sent from and received by client device 102 over network 112.

In these illustrative examples, user interface for managing communications 108 may be used by communications management system 110 to prompt a user to select a set of access-oriented actions to perform for an electronic communication. For example, communications management system 110 may prompt a sender of an electronic communication to select at least one of changing the communication, restricting access to the communication, identifying a particular group of recipients for the communication, initiating a process for granting one or more access permissions for accessing a resource pointed to by a reference in the communication to one or more of a set of users having access to the communication, and continuing processing of the communication. In this example, communications management system 110 may prompt the sender to select the set of access-oriented actions based on a determination that a receiver of the communication does not have a set of access permissions corresponding to the set of permissions required to access the resource pointed to by the reference in the communication.

The illustration of communications management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional social networks, in addition to social network 114, may be present within communications management environment 100. As another example, a plurality of web servers, including but not limited to social network 114, email server 115, search engine 116, and database 142 may be present in communications management environment 100. In this example, each of the plurality of web servers may be used by communications management system 110 to generate and send user interface for managing communications 108 to client device 102 in a process for managing access to a resource pointed to by a reference detected in a communication.

Also, although communications management system 110 is shown as a block separate from group of computer systems 156, communications management system 110 may be implemented in computer system 158. In other examples, communications management system 110 may be implemented in one or more computer systems in group of computer systems 156. For example, communications management system 110 may be implemented in a computer that is sending an electronic communication, in another computer that is receiving an electronic communication, and may also be implemented in both the sending and receiving computers of electronic communications.

Further, although social network 114, email server 115, search engine 116, and database 142 are shown in the block for communications management environment 100, each of the plurality of web servers used by communications management system 110 may be remote from each other, such as by being in different locations. For example, social network 114 may be located in a first physical location and email server 115 may be located in a second physical location different from the first physical location.

In addition to social network 114 and email server 115, additional servers that support electronic communications sent between users may also present and managed in communications management environment 100. For example, instant messaging servers, texting servers, blogging servers, and any other suitable type of server for electronic communications between users may be present in communications management environment 100. In this example, each electronic communication sent between users of these servers may be examples of communication 118 comprising a reference to a resource such as reference 120.

Figure 2:
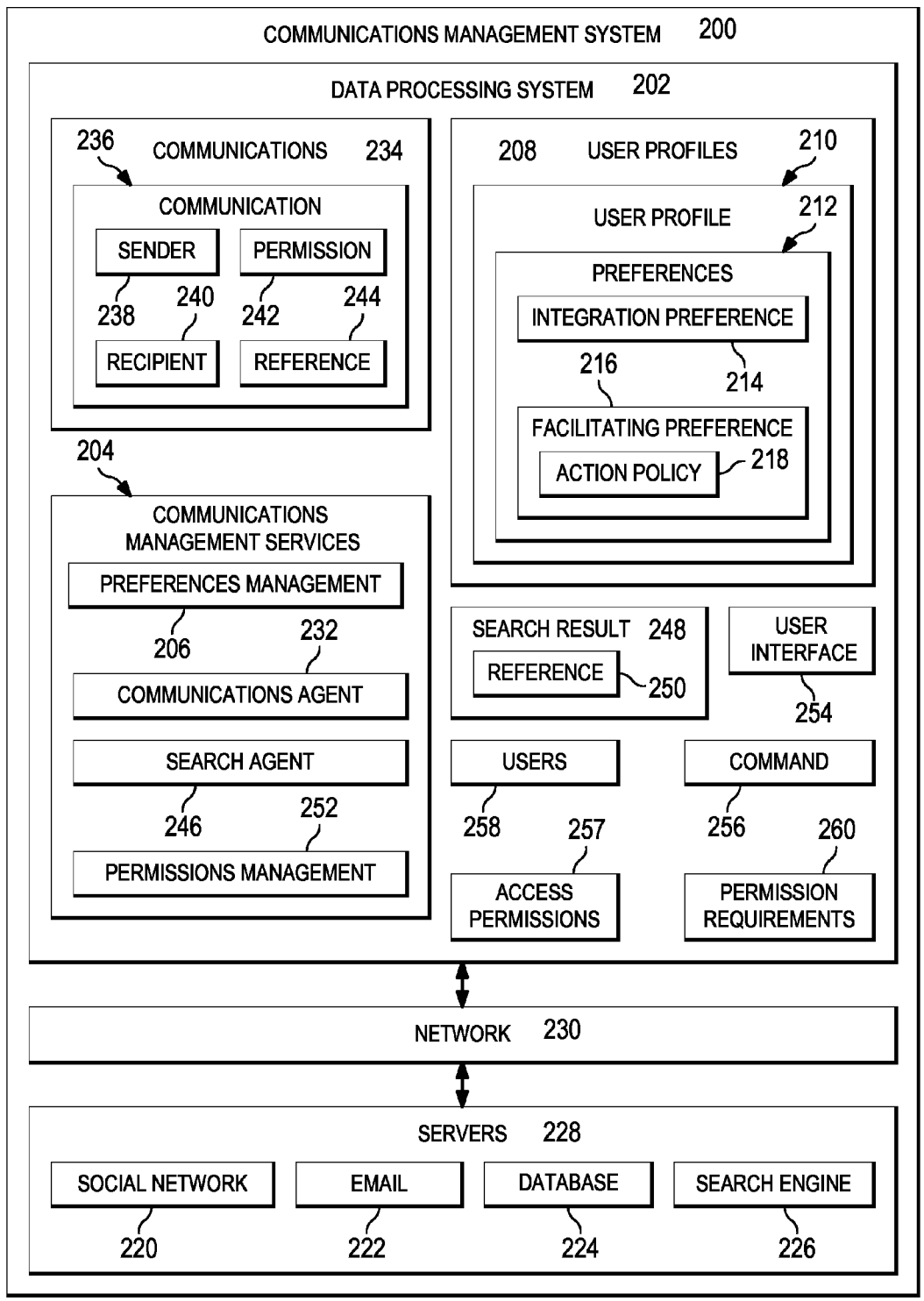
FIG. 2 is a block diagram of components involved in managing access to a resource pointed to by a reference in a data processing system in a communications management system in accordance with an illustrative embodiment.

Turning next to FIG. 2, a block diagram of components involved in managing access to a resource pointed to by a reference in a data processing system in a communications management system is depicted in accordance with an illustrative embodiment. Communications management system 200 is an example of one implementation of communications management system 110 in communications management environment 100 in FIG. 1.

In this illustrative example, data processing system 202 is present in communications management system 200. Data processing system 202 may be any combination of hardware components implementing communications management system 200. Data processing system 202 comprises communications management services 204. In these illustrative examples, communications management services 204 comprise a number of services that manage communications. Preferences management 206 is a service included in communications management services 204 that manages user profiles of users of communications management system 200.

As depicted, user profiles 208 include one or more profiles in communications management system 200 of users of communications management system 200. In these illustrative examples, user profile 210 is a user profile located in user profiles 208. Each user profile in user profiles 208 is an account or other record of information about a user of communications management system 200. In these illustrative examples, user profiles, such as user profile 210, include preferences 212 of users of communications management system 200. Preferences 212 of users may be selected by a user, an administrator, and by a rule using default preferences. In these illustrative examples, preferences 212 include at least one of preferences for integration with web servers, such as integration preference 214 and preferences for facilitating access to resources pointed to by references in communications, such as facilitating preference 216, and other suitable types of preferences. In these illustrative examples, facilitating preference 216 may include policies, such as action policy 218. In these illustrative examples, action policy 218 may comprise one or more rules for selecting a set of access-oriented actions to facilitate access to a resource pointed to by a reference in an electronic communication in communications management system 200. For example, action policy 218 may include a rule to select a set of access-oriented actions based on a determination that a user does not have permission to access a resource pointed to by a reference in an electronic communication. As used herein, the term "access-oriented actions" means actions to facilitate access to a resource pointed to by a reference.

In these illustrative examples, integration preference 214 of user profile 210 includes an identification of one or more servers, such as social network 220, email 222, database 224, search engine 226 and other suitable servers in servers 228 in communications management system 200. As depicted, integration preference 214 may also include an identification of information for communicating with each server in servers 228. For example, the information for communicating with each server in servers 228 may include an identification of interfaces for each server, networking protocols of each server, networking addresses of each sever, user names and passwords for gaining access to communications and data in each server, and any other suitable information for communicating with each server in servers 228 over network 230. In these illustrative examples, social network 220 is an example of social network 114 in FIG. 1, email 222 is an example of email server 115 in FIG. 1, database 224 is an example of database 142 in FIG. 1, and search engine 226 is an example of search engine 116 in FIG. 1.

Communications agent 232 is a service included in communications management services 204 for processing communications 234. In these illustrative examples, communications 234 is a set of communications in data processing system 202. For example, communications 234 may be an example of communications 144 in database 142 in FIG. 1. As depicted, communication 236 is an example of a communication in communications 234. In these illustrative examples, communication 236 may be selected by communications agent 232 from communications sent to and from servers 228 over network 230. Communications agent 232 may process communication 236 before, during, and after communication 236 has been sent, posted, or reposted. Communication 236 may be an example of communication 118 in FIG. 1, an example of email 126 in FIG. 1, an example of communication 146 in FIG. 1, and any other suitable communication in communications management system 200.

As depicted, communication 236 may comprise a set of senders, such as sender 238, a set of recipients, such as recipient 240, a set of permissions, such as permission 242, and a set of references, such as reference 244, and any other suitable information for a communication in communications management system 200. Sender 238 and recipient 240 may be users of communications management system 200. More particularly, sender 238 and recipient 240 may be examples of users 109 in FIG. 1. For example, sender 238 may be a user sending email 126 in FIG. 1, a user posting communication 118 in FIG. 1, a user searching for references in search engine 116, and any other suitable sender of a communication in communications management system 200. In these illustrative examples recipient 240 may be any suitable recipient of communication 236 in communications management system 200. In these illustrative examples, reference 244 is an example of reference 120, reference 128, reference 136, reference 138, reference 140, reference 148, and any other suitable reference in communications management system 200. As depicted, permission 242 in communication 236 may be permission for recipient 240 to access reference 244.

Search agent 246 is a service included in communications management services 204 for processing search results generated by search engine 116, such as search result 248. As depicted, search result 248 may include references, such as reference 250. In these illustrative examples, reference 250 is an example of reference 136 in FIG. 1, reference 138 in FIG. 1, and reference 140 in FIG. 1.

Permissions management 252 is a service included in communications management services 204 for managing communications in communications management system 200, such as communication 236 and search result 248. As depicted, permissions management 252 generates user interface 254 for managing communications. User interface 254 is an example of user interface for managing communications 108 in FIG. 1. In these illustrative examples, generated user interface 254 may comprise a copy of communication 236, a set of recipients of communication 236 that do not have access to a resource pointed to by reference 244, a means for selecting a set of access-oriented actions to perform to manage access to resource pointed to by reference 244, and other suitable information for managing access to a resource pointed to by reference 244 in communications management system 200. User interface 254 may be a web page generated for use by a web browser on a graphical user interface. User interface 254 may also be a web page generated for use by an audio based web browser.

As depicted, permissions management 252 generates commands, such as command 256, for initiating actions associated with a set of permissions. In these illustrative examples, command 256 may be a command to initiate a set of access-oriented actions selected by sender 238 of communication 236. Command 256 may also be a command selected by permissions management 252 based on rules in action policy 218. For example, command 256 may be a command to initiate a change to communication 236, a command to restrict access to communication 236, a command to identify a particular group of recipients for communication 236, a command to initiate a process for granting access permissions 257 for accessing a resource pointed to by reference 244 in communication 236 to users 258, and a command to continue processing of the communication.

In these illustrative examples, users 258 may be a set of users that have access to communication 236. As depicted, permission requirements 260 may be a set of permissions required for users 258 to access a resource pointed to by reference 244. For example, in a process for managing access to a resource pointed to by reference 244 in communication 236 permissions management 252 may identify a set of permissions in permission requirements 260 that are required to access the resource pointed to by reference 244. In this example, permissions management 252 may next determine whether a user with access to communication 236 has a set of access permissions corresponding to the set of permissions in permission requirements 260 that are required to access the resource pointed to by reference 244. Further in this example, responsive to a determination that a user does not have access to the resource pointed to by reference 244, permissions management 252 may then select and perform a set of access-oriented actions based on rules in action policy 218 for facilitating access to resource pointed to by reference 244.

In these illustrative examples, the set of access-oriented actions may be to begin a workflow for facilitating access to the resource pointed to by reference 244 for users 258. Permissions management 252 may also intermittently re-determine if users that have access to communication 236 have access to resource pointed to by reference 244 in communication 236. Permissions management 252 may notify sender 238 of communication 236 when access to the resource pointed to by reference 244 has been modified for a user that has access to communication 236. Subsequent to starting the workflow, permissions management 252 may notify sender 238 of communication 236 to prompt sender 238 to continue or stop the workflow.

The illustration of communications management system 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional services, in addition to the services shown communications management services 204, may be present within communications management system 200. For example, a service in services 162 in FIG. 1 to authorize computing devices such as client device 102 in FIG. 1 may be included in communications management system 200. In this example, the authorization of client device 102 may be required by a preference in integration preferences 214 and by a rule in action policy 218 before client device 102 is allowed access to a resource pointed to by a reference.

As another example, database 224 may also be included in data processing system 202 and in one or more other servers in servers 228. As yet another example, one or more servers in servers 228 may be located in data processing system 202. In this example, each server in servers 228 may be running as one or more applications and system services in data processing system 202.

Figure 3:
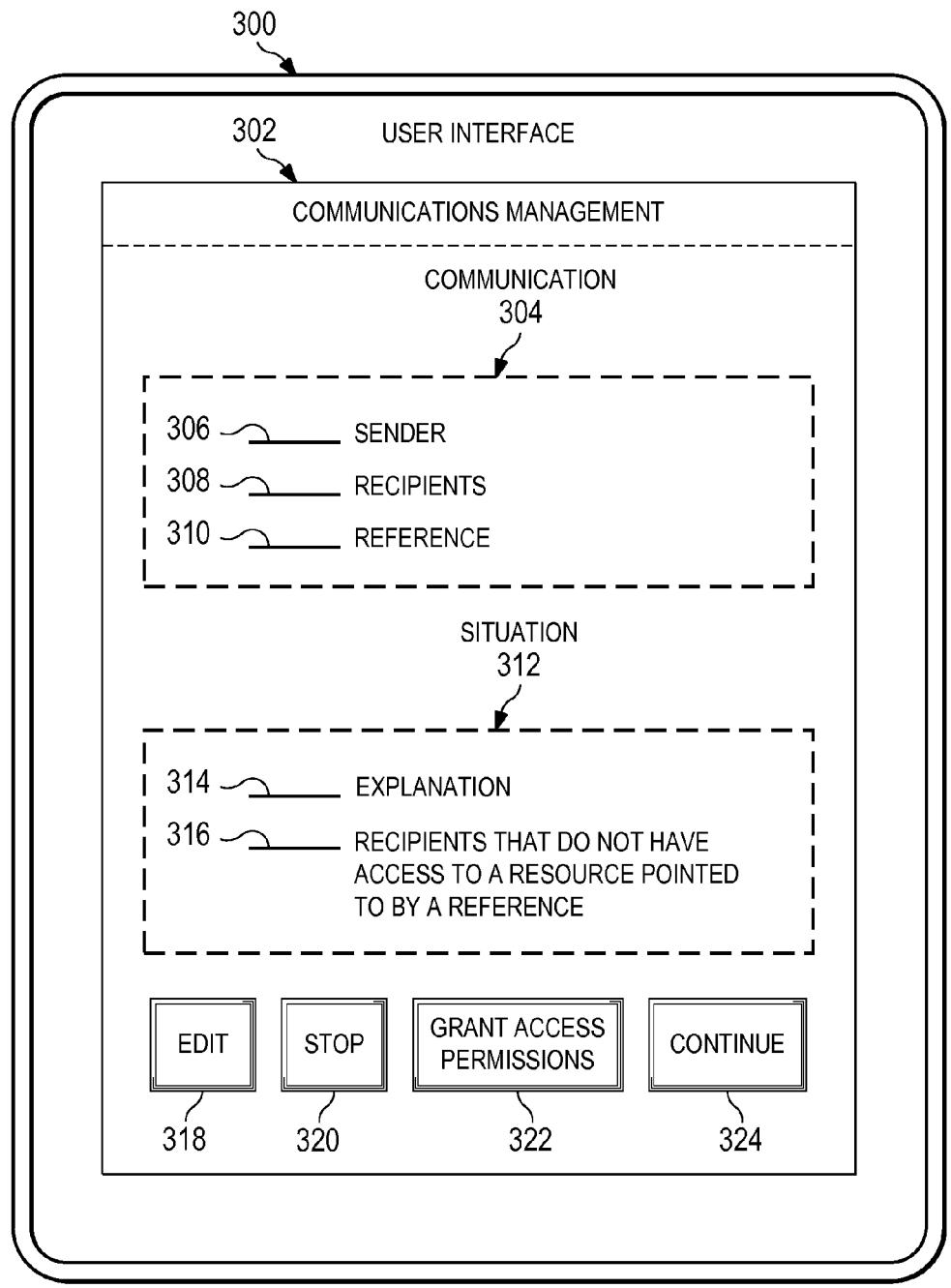
FIG. 3 is an illustration of a user interface for managing to access to a resource pointed to by a reference in an electronic communication in accordance with an illustrative embodiment.

With reference now to FIG. 3, an illustration of a user interface for managing to access to a resource pointed to by a reference in an electronic communication is depicted in accordance with an illustrative embodiment. User interface 300 is an illustrative example of one implementation of a graphical user interface for communications management services 204 in FIG. 2 in data processing system 202 in FIG. 2. In other illustrative examples, user interface 300 may also be any type of user interface suitable for presenting the contents of user interface 300 to one or more users.

In this illustrative example, user interface 300 includes a user interface window of permissions management 252 in communications management services 204 in FIG. 2. Communications management 302 is a window present in user interface 300 used to prompt a user to select a set of access-oriented actions associated with recipients that do not have access to a resource pointed to by a reference in an electronic communication. As depicted, the window of communications management 302 includes communication 304. Communication 304 is an example of communication 236 in FIG. 2. As depicted, communication 304 comprises sender 306, recipients 308, and reference 310. In this illustrative example, sender 306 is an example of sender 238 in FIG. 2. Recipients 308 may be a set of recipients who have access to communication 304, such as recipient 240 in FIG. 2. Reference 310 is an example of reference 244 in FIG. 2.

As depicted, the window of communications management 302 includes situation 312. In this illustrative example, situation 312 is a description of users that have access to communication 304 and do not have access to a resource pointed to by reference 310 in communication 304. As depicted, situation 312 includes explanation 314 for situation 312 and recipients that do not have access to a resource pointed to by a reference 316.

Edit 318 is a button in communications management 302 to initiate a set of access-oriented actions for modifying communication 304. Stop 320 is a button in communications management 302 to initiate a set of access-oriented actions to stop a processing of communication 304. Grant access permissions 322 is a button in communications management 302 to initiate a set of access-oriented actions to grant recipients that do not have access to a resource pointed to by reference 310 permission to access the resource pointed to by reference 310. Continue 324 is a button in communications management 302 to initiate a set of access-oriented actions to continue processing of communication 304.

Figure 4:
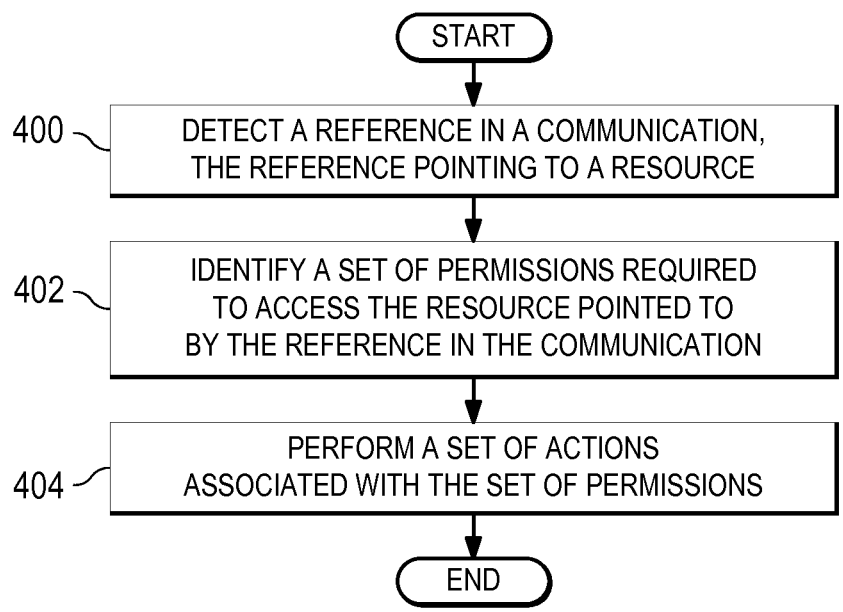
FIG. 4 is a flow chart of a process for managing access to a resource pointed to by a reference in accordance with an illustrative embodiment.

Turning next to FIG. 4, an illustrative example of a flowchart of a process for managing access to a resource pointed to by a reference is depicted in accordance with an illustrative embodiment. The steps in FIG. 4 may be implemented communications management system 200 in FIG. 2. In particular, the steps in the process may be implemented in software, hardware, or a combination of the two in communications management services 204 in data processing system 202 in FIG. 2.

The process begins by detecting a reference in an electronic communication, wherein the reference points to a resource (step 400). In this illustrated process, the reference in the communication is an example of reference 244 in communication 236 in FIG. 2. The reference in the communication is also an example of reference 250 in search result 248 in FIG. 2.

The process next identifies a set of permissions required to access the resource pointed to by the reference in the communication (step 402). In this illustrated process, the set of permissions required to access the resource pointed to by the reference is an example of a set of permissions required for the resource in permission requirements 260 in FIG. 2.

The process then performs a set of access-oriented actions associated with the set of permissions (step 404) with the process terminating thereafter.

Figure 5:
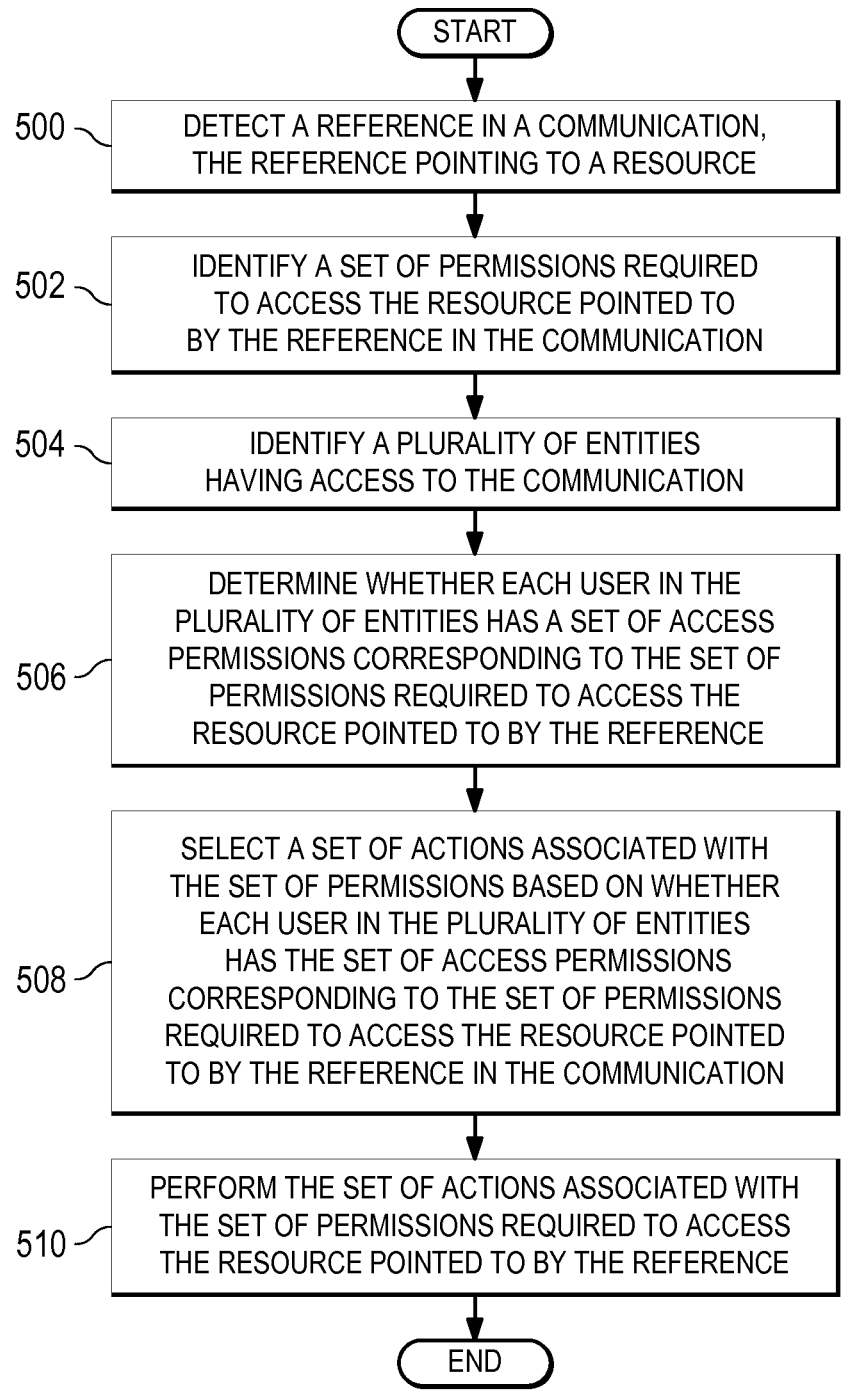
FIG. 5 is a flow chart of a process for selecting and performing a set of access-oriented actions associated with a set of permissions required to access a resource pointed to by a reference in an electronic communication in accordance with an illustrative embodiment.

Turning next to FIG. 5, an illustrative example of a flowchart of a process for selecting and performing a set of access-oriented actions associated with a set of permissions required to access a resource pointed to by a reference in an electronic communication is depicted in accordance with an illustrative embodiment. The steps in FIG. 5 may be implemented in communications management system 200 in FIG. 2. In particular, the steps in the process may be implemented in software, hardware, or a combination of the two using communications management services 204 in data processing system 202 in FIG. 2.

The process begins by detecting a reference in an electronic communication, wherein the reference points to a resource (step 500). In this illustrated process, the reference in the communication is an example of reference 244 in communication 236 in FIG. 2. The reference in the communication is also an example of reference 250 in search result 248 in FIG. 2. The process next identifies a set of permissions required to access the resource pointed to by the reference in the communication (step 502). In this illustrated process, the set of permissions required to access the resource pointed to by the reference is an example of a set of permissions required for the resource in permission requirements 260 in FIG. 2. The process identifies a set of users having access to the communication (step 504). In this illustrated process, the set of users having access to the communication are examples of users 258 in FIG. 2.

The process next determines whether each user in the set of users has a set of access permissions required to access the resource pointed to by the reference in the communication (step 506). In this illustrated process, the set of access permissions of each user is an example of a set of access permissions in access permissions 256 in FIG. 2.

The process selects a set of access-oriented actions associated with the set of permissions based on whether each user in the set of users has the set of access permissions corresponding to the set of permissions required to access the resource pointed to by the reference in the communication (step 508). The process then performs the set of access-oriented actions associated with the set of permissions required to access the resource pointed to by the reference (step 510) with the process terminating thereafter.

Figure 6:
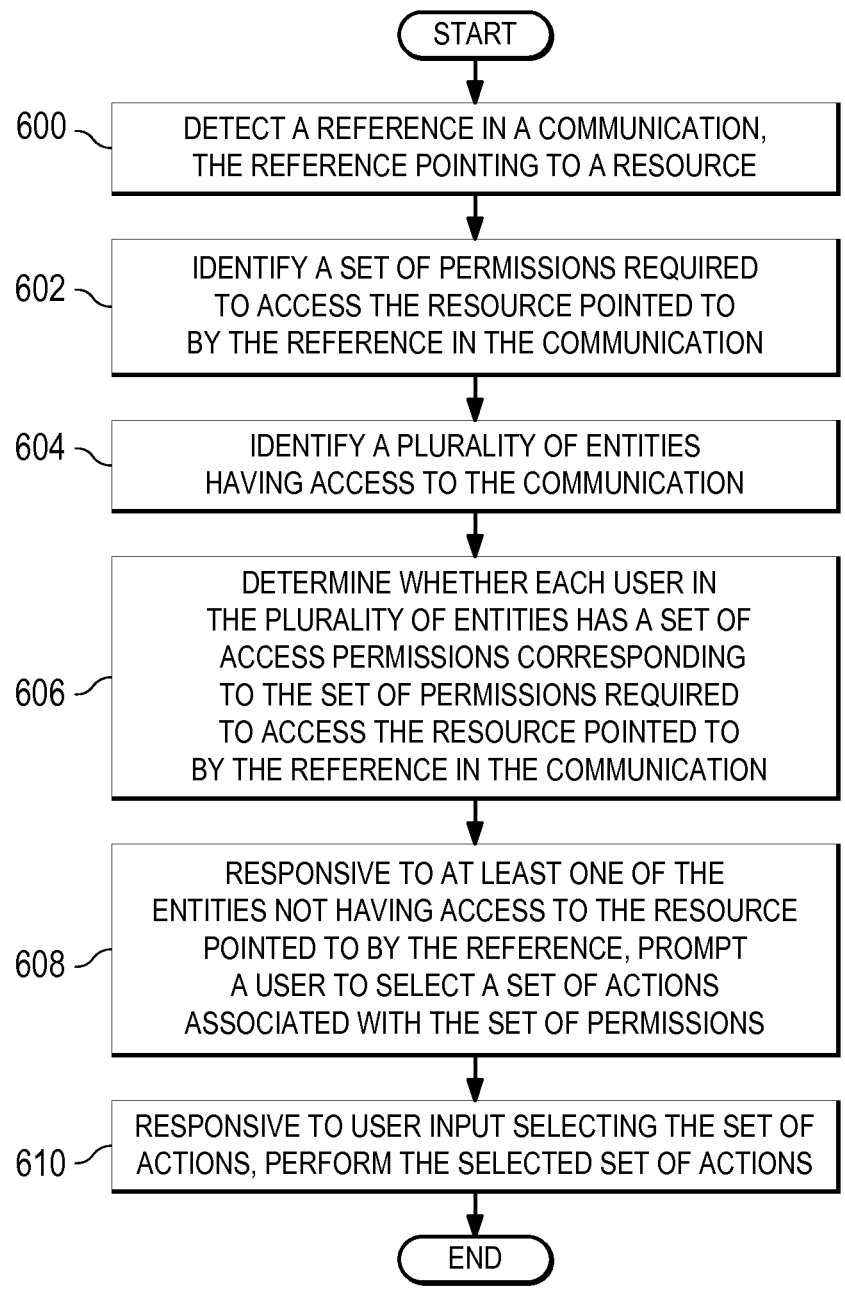
FIG. 6 is a flow chart of a process for prompting a sender of an electronic communication to select actions associated with a reference in the electronic communication in accordance with an illustrative embodiment.

Turning next to FIG. 6, an illustrative example of a flowchart of a process for prompting a sender of an electronic communication to select actions associated with a reference in the communication is depicted in accordance with an illustrative embodiment. The steps in FIG. 6 may be implemented in communications management system 200 in FIG. 2. In particular, the steps in the process may be implemented in software, hardware, or a combination of the two in communications management services 204 in data processing system 202 in FIG. 2.

The process begins by detecting a reference in an electronic communication, wherein the reference points to a resource (step 600). In this illustrated process, the reference in the communication is an example of reference 244 in communication 236 in FIG. 2. The reference in the communication is also an example of reference 250 in search result 248 in FIG. 2. The process next identifies a set of permissions required to access the resource pointed to by the reference in the communication (step 602). In this illustrated process, the set of permissions required to access the resource pointed to by the reference is an example of a set of permissions required for the source in permission requirements 260 in FIG. 2. The process identifies a set of users having access to the communication (step 604). In this illustrated process, the set of users having access to the communication are examples of users 258 in FIG. 2.

The process next determines whether each user in the set of users has a set of access permissions required to access the resource pointed to by the reference in the communication (step 606). In this illustrated process, the set of access permissions of each user is an example of a set of access permissions in access permissions 256 in FIG. 2.

Responsive to at least one of the users not having access to the resource pointed to by the reference, the process prompts a user to select a set of access-oriented actions associated with the set of permissions (step 608). The process then performs the set of access-oriented actions associated with the set of permissions responsive to receiving user input selecting the set of access-oriented actions (step 610) with the process terminating thereafter.

Figure 7:
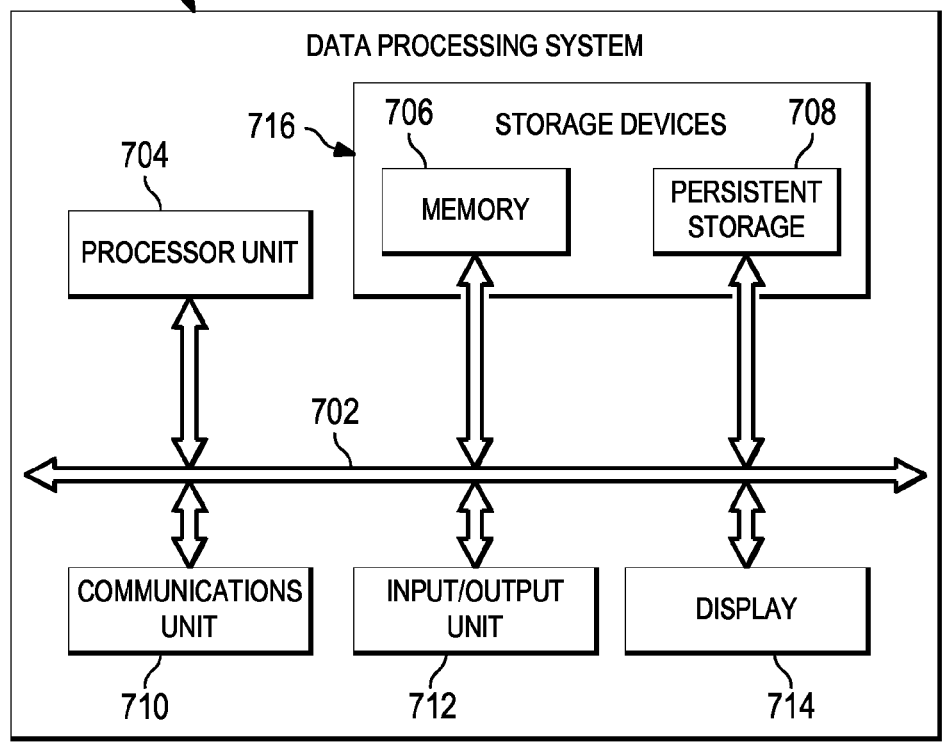
FIG. 7 is an illustration of a data processing system in accordance with an illustrative embodiment.
Figure 7:
Figure 7:
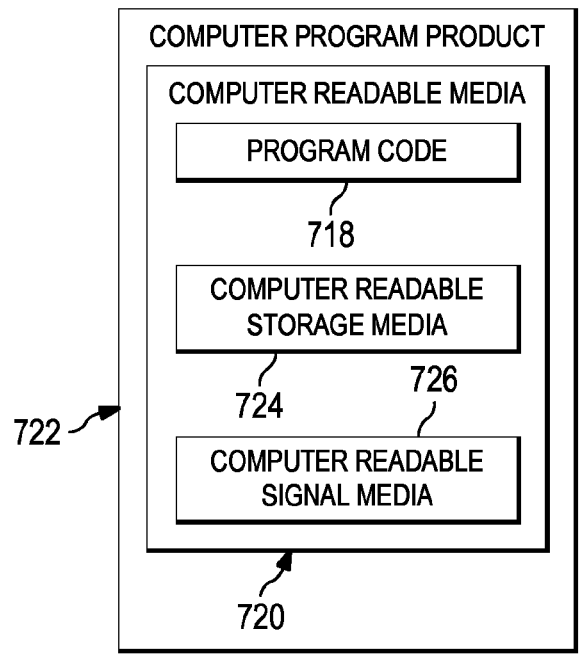

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of a data processing system that may be used to implement managing access to a reference in a communications management system. Data processing system 700 is also an example of a data processing system that may be used to implement communications management system 110 in FIG. 1, client device 102 in FIG. 1, social network 114, email server 115, search engine 116, database 142 in FIG. 1, and computer system 158 in FIG. 1. More particularly, data processing system 700 may be used to implement data processing system 202 in FIG. 2 and servers 228 in FIG. 2.

Processor unit 704 serves to process instructions for software that may be loaded into memory 706. Processor unit 704 may be a number of processors, a multi-processor core, or some other type of processor, depending on the particular implementation. "A number," as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for processing by processor unit 704. The processes of the different embodiments may be performed by processor unit 704 using computer-implemented instructions, which may be located in a memory, such as memory 706.

These instructions are referred to as program code, computer usable program code, or computer readable program code that may be read and processed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for processing by processor unit 704. Program code 718 and computer readable media 720 form computer program product 722 in these examples. In one example, computer readable media 720 may be computer readable storage media 724 or computer readable signal media 726.

Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700.

In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, a remote data processing system, or some other device capable of storing and transmitting program code 718. For example, program code stored in the computer readable storage medium in data processing system 700 may be downloaded over a network from the remote data processing system to the computer readable storage medium in data processing system 700. Additionally, program code stored in the computer readable storage medium in the server computer may be downloaded over the network from the server computer to a computer readable storage medium in the remote data processing system.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic device, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, communications unit 710 may include a number of devices that transmit data, receive data, or transmit and receive data. Communications unit 710 may be, for example, a modem or a network adapter, two network adapters, or some combination thereof. Further, a memory may be, for example, memory 706, or a cache, such as found in an interface and memory controller hub that may be present in communications fabric 702.

Thus, the illustrative embodiments provide a method, apparatus, and computer program product for managing electronic communications. In one example, a program runs in a computer system to detect a reference in an electronic communication, wherein the reference points to a resource stored in storage of a data processing system. The program identifies a set of permissions required to access the resource pointed to by the reference in the communication. The program then performs a set of access-oriented actions associated with the set of permissions. The set of access-oriented actions may be selected by the program based on whether users have permission to access the resource pointed to by the reference in the communication. The set actions associated with the set of permissions may include the computer prompting a sender of the communication to select at least one of changing the communication, restricting access to the communication, identifying a particular group of recipients for the communication, initiating a process for granting one or more access permissions for accessing the resource pointed to by the reference in the communication to one or more of the set of users having access to the communication, and continuing processing of the communication. The set of access-oriented actions associated with the set of permissions may particularly include the computer generating a request for access to the resource pointed to by the reference for recipients of the communication. In particular the set of access-oriented actions may be performed prior to a user receiving the communication, prior to a sending of the communication, and prior to an attempt to access the resource pointed to by the reference in the communication.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

Thus, the illustrative embodiments provide a method, apparatus, and computer program product for managing authorizations to access personal data. The invention solves the problem of managing authorizations of a plurality of web based applications to access personal data, by providing an communications management system using the plurality of web based applications to generate one user interface for managing each of the authorizations of the plurality of web based applications.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing electronic communications, the method comprising:
   detecting, by one or more processors, a reference in an electronic communication, the reference pointing to a resource stored in storage of a data processing system;
   identifying, by one or more processors, a set of permissions required to access the resource pointed to by the reference in the electronic communication; and
   performing, by one or more processors, a set of access-oriented actions associated with the set of permissions.

2. The method of claim 1, further comprising:
   one or more processors identifying a set of users having access to the electronic communication;
   one or more processors determining for each user in the set of users, whether the user has a set of access permissions corresponding to the set of permissions required to access the resource pointed to by the reference in the electronic communication; and
   one or more processors selecting the set of access-oriented actions based on whether each user in the set of users has the set of access permissions corresponding to the set of permissions required to access the resource pointed to by the reference in the electronic communication.

3. The method of claim 2, wherein the set of access-oriented actions include the computer prompting a sender of the electronic communication to select at least one of changing the electronic communication, restricting access to the electronic communication, identifying a particular group of recipients for the electronic communication, initiating a process for granting one or more access permissions for accessing the resource pointed to by the reference in the electronic communication to one or more of the set of users having access to the electronic communication, and continuing processing of the electronic communication.

4. The method of claim 1, wherein the set of access-oriented actions associated with the set of permissions includes one or more processors generating a request for access to the resource for recipients of the electronic communication.

5. The method of claim 1, wherein the electronic communication is selected from one of an instant message, a posting, a reposting, an email, and a search result.

6. The method of claim 1, wherein detecting, by one or more processors, the reference in the electronic communication further comprises:
one or more processors parsing the electronic communication to identify a set of references in the electronic communication; and
one or more processors selecting the reference in the electronic communication from the set of references identified in the electronic communication.

7. The method of claim 1, wherein the set of access-oriented actions include presenting an indication that the electronic communication comprises the reference pointing to the resource that requires the set of permissions.

8. The method of claim 2, wherein the set of access-oriented actions include presenting a list of users that do not have the required set of access permissions corresponding to the set of permissions required to access the resource pointed to by the reference in the electronic communication.

9. An apparatus for managing electronic communications, the apparatus comprising:
one or more processors, a memory, and a computer readable storage device;
first program instructions to detect a reference in an electronic communication, the reference pointing to a resource stored in storage of a data processing system;
second program instructions to identify a set of permissions required to access the resource pointed to by the reference in the electronic communication; and
third program instructions to perform a set of access-oriented actions associated with the set of permissions, wherein the first program instructions, the second program instructions, and the third program instructions are stored in the computer readable storage device for execution by the one or more processors via the memory.

10. The apparatus of claim 9, further comprising:
fourth program instructions to identify a set of users having access to the electronic communication;
fifth program instructions to determine for each user in the set of users, whether the user has a set of access permissions corresponding to the set of permissions required to access the resource pointed to by the reference in the electronic communication; and
sixth program instructions to select the set of access-oriented actions based on whether each user in the set of users has the set of access permissions corresponding to the set of permissions required to access the resource pointed to by the reference in the electronic communication, wherein the fourth program instructions, the fifth program instructions, and the sixth program instructions are stored in the computer readable storage device for execution by the one or more processors via the memory.

11. The apparatus of claim 10, wherein the set of access-oriented actions include prompting a sender of the electronic communication to select at least one of changing the electronic communication, restricting access to the electronic communication, identifying a particular group of recipients for the electronic communication, initiating a process for granting one or more access permissions for accessing the resource pointed to by the reference in the electronic communication to one or more of the set of users having access to the electronic communication, and continuing processing of the electronic communication.

12. The apparatus of claim 9, wherein the set of access-oriented actions associated with the set of permissions includes generating a request for access to the resource for recipients of the electronic communication.

13. The apparatus of claim 9, wherein the electronic communication is selected from one of an instant message, a posting, a reposting, an email, and a search result.

14. The apparatus of claim 9, wherein the first program instructions to detect the reference in the electronic communication further comprises:
program instructions to parse the electronic communication to identify a set of references in the electronic communication; and
program instructions to select the reference in the electronic communication from the set of references identified in the electronic communication.

15. The apparatus of claim 9, wherein the set of access-oriented actions include presenting an indication that the electronic communication comprises the reference pointing to the resource that requires the set of permissions.

16. The apparatus of claim 10, wherein the set of access-oriented actions include presenting a list of users that do not have the required set of access permissions corresponding to the set of permissions required to access the resource pointed to by the reference in the electronic communication.

17. A computer program product comprising:
a computer readable storage device in a data processing system;
a communications management system running on the data processing system for managing electronic communications;
program instructions of the communications management system, stored on the computer readable storage device, for detecting a reference in an electronic communication, the reference pointing to a resource stored in storage of a data processing system;
program instructions of the communications management system, stored on the computer readable storage device, for identifying a set of permissions required to access the resource pointed to by the reference in the electronic communication; and
program instructions of the communications management system, stored on the computer readable storage device, for performing a set of access-oriented actions associated with the set of permissions.

18. The computer program product of claim 17, wherein the communications management system comprises a plurality of programs and wherein one program in the communications management system running on the data processing system causes another program to be downloaded to the data processing system while managing electronic communications.

19. The computer program product of claim 17, wherein the program instructions of the communications management system are downloaded over a network from a remote data processing system to the computer readable storage device in the data processing system.

20. The computer program product of claim 19, wherein the computer readable storage device in the data processing system is a first computer readable storage device in a server data processing system, and wherein the program instructions of the communications management system are downloaded over the network to the remote data processing system for use in a second computer readable storage device in the remote data processing system.

\* \* \* \* \*